Jan. 20, 1948.   R. O. CORNETT   2,434,837
NULL-TYPE DIFFERENTIAL MICROMANOMETER
Filed Jan. 11, 1944

Richard O. Cornett INVENTOR.

BY
Victor J. Evans & Co.
ATTORNEYS

Patented Jan. 20, 1948

2,434,837

UNITED STATES PATENT OFFICE 2,434,837

NULL-TYPE DIFFERENTIAL MICRO-MANOMETER

Richard O. Cornett, Cambridge, Mass.

Application January 11, 1944, Serial No. 517,847

6 Claims. (Cl. 73—401)

My invention relates to the measuring of pressure differences, and has among its objects and advantages the provision of an improved null-type differential micromanometer. The device is particularly well suited for measuring pressure differences at the outlets of Venturi meters. These pressure differences are of magnitudes ranging from .00002 mm. of mercury to 5 mm. of mercury, measured in a continuous range, which range can be changed through alteration in the dimensions of various parts of the device.

In the embodiment of the invention selected for illustration, I make use of two chambers 10 and 12 of identical size, each provided with a plug 14 and a tube 16 communicating with that chamber and the atmosphere. Gaskets 18 are interposed between the plugs 14 and their respective chambers to provide an airtight connection.

Figure 1:
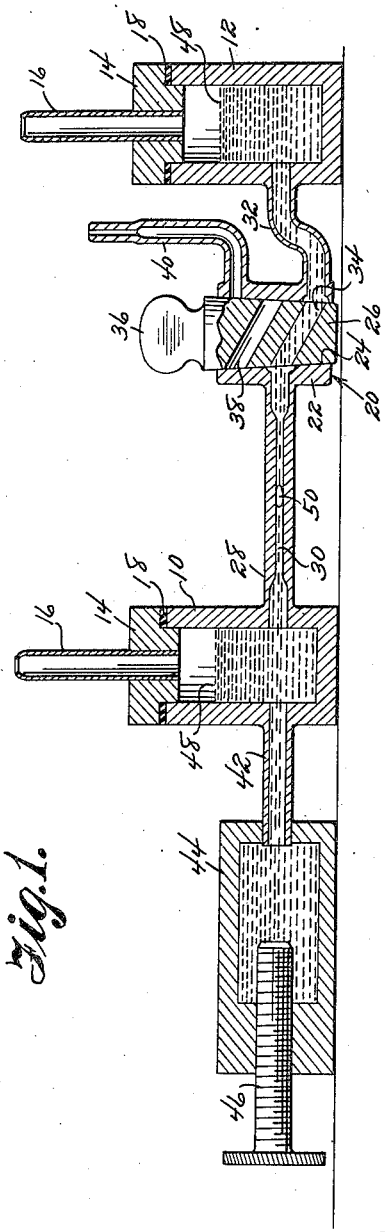
Figure 1 is a longitudinal sectional view of the invention.
Figure 2:
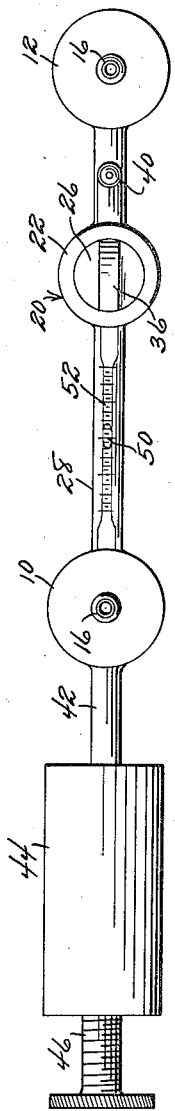
Figure 2 is a top plan view.

Located between the chambers 10 and 12 is a valve 20, which comprises a body 22 provided with a tapered bore 24 for the reception of a plug 26 of corresponding taper. A glass or transparent tube 28 places the chamber 10 in communication with the body 22, this tube being provided with a capillary passage 30. A tube 32 places the chamber 12 in communication with the body 22, and communication is established between the chambers 10 and 12 by means of a passage 34 in the plug 26 when the latter is positioned according to Figure 1. However, the plug may be rotated to cut off such communication. A wing 36 is fixed to the plug 26 to indicate the position of the plug.

The plug 26 is provided with a second passage 38 which places the tube 28 in communication with an air tube 40 communicating with the body 22 at its upper end. The tube 28 has communication with the body 22 at substantially a midpoint with respect to the spacing between the tubes 32 and 40, so that the angular arrangement of the passages 34 and 38 may be selectively brought into communication with the passage 30 through rotation of the plug 26 to predetermined positions. While slight rotation of the plug 26 brings the passage 34 into and out of communication with the tubes 28 and 32, the passage 38 is brought into communication with the tubes 28 and 40 only through rotation of the plug through 180 degrees from the position of Figure 1.

A second tube 42 places the chamber 10 in communication with a reservoir 44 provided with a displacement screw 46 threaded through one wall of the reservoir. The instrument is supplied with a liquid such as alcohol or other liquid of low tension and viscosity. The liquid level is indicated at 48 in the chambers 10 and 12, and the reservoir 44 is filled with the liquid.

In operation, the tubes or inlets 16 are open to the atmosphere, and the screw 46 is adjusted for forcing liquid into or out of the chamber 10 until the air bubble or index 50 in the capillary passage 30 is adjusted to an equilibrium position at the center of a scale 52 on the tube 28. This position is recorded. The plug 26 is rotated from the position of Figure 1 and the pressure differential to be measured is connected to the tubes 16. The plug 26 is then rotated slowly to the position of Figure 1. As the air bubble 50 begins to move, the screw 46 is adjusted to stop the air bubble and cause it to return to near its original position at the approximate center of the tube 28.

From the density of the liquid, at existing temperatures, positions and dimensions of the screw 46, positions of the air bubble 50 and the size of the capillary passage 30, together with the sizes (identical) of the chambers 10 and 12, the pressure differential can be computed. The tube 40 provides means whereby air may be introduced for changing the size of the air bubble 50. The use of the air bubble as a null-indicator makes possible the use of an exceptionally short and small capillary tube, thereby increasing sensitivity and speed of action of the instrument in a large degree. The use of the screw 46 or other equivalent means for supplying a measurable amount of liquid from the reservoir 44 makes possible the measurement of a large range of pressure differences.

Instruments employing a relatively long tube are objectionable because the length of the tube necessary for measuring pressure differences over any practical range of magnitudes, makes the air bubble so insensitive and slow acting (unless the capillary is made large which reduces the sensitivity just as much) as to render the instrument inaccurate. In such instruments, the air bubble is used to indicate the pressure difference by moving a proportional distance along the tube. This introduces an error due to seepage of liquid passed the bubble. In the present device, the air bubble is employed as a null-indicator, and it remains at or near one position, instead of moving any appreciable amount.

Without further elaboration, the foregoing will so fully explain my invention, that others may, by applying current knowledge, readily adapt the same for use under various conditions of service.

I claim:

1. An instrument of the type described comprising a liquid containing transparent capillary tube having an index therein, liquid containing chambers of greater diameters than said tube communicating with the ends of the tube, means for connecting the pressure differential to be measured to said chambers, and a reservoir having liquid displacement means therein having communication with one of said chambers to control the movement of said index.

2. A differential pressure instrument comprising a liquid containing transparent capillary tube having an air bubble therein, liquid containing pressure chambers of greater diameters than said tube communicating with the respective ends of the tube, means for connecting the pressure differential to be measured to said chambers and a reservoir having liquid displacement means therein having communication with one of said chambers to control the movement of said air bubble.

3. A differential pressure device of the type described comprising a liquid containing transparent capillary tube having an index therein, liquid containing pressure chambers of identical but greater diameters than said tube communicating with the respective ends of the tube, means for connecting the pressure differential to be measured to said chambers and a reservoir having liquid displacement means therein having communication with one of said chambers to control the movement of said index.

4. A differential pressure instrument comprising a liquid containing transparent capillary tube having an air bubble therein, liquid containing chambers of identical but greater diameters than said tube communicating with the respective ends of the tube, means for connecting the pressure differential to be measured to said chambers, a liquid containing reservoir communicating with one of said chambers, and a screw actuated liquid displacement means extending into said reservoir for supplying and removing liquid with respect to the said one chamber for controlling the movement of said air bubble.

5. A differential pressure instrument comprising a liquid containing transparent capillary tube having an air bubble therein, liquid containing chambers of identical but greater diameters than said tube communicating with the respective ends of the tube, means for connecting the pressure differential to be measured to said chambers, a liquid containing reservoir communicating with one of said chambers, a screw actuated liquid displacement means extending into said reservoir for supplying and removing liquid with respect to the said one chamber for controlling the movement of said air bubble, and an air introducing valve interposed between said chambers and having controlled communication with said tube.

6. A differential pressure instrument comprising a liquid containing transparent capillary tube having an air bubble therein, liquid containing chambers of identical but greater diameters than said tube, means for connecting the pressure differential to be measured to said chambers, a liquid containing reservoir communicating with one of said chambers, a screw actuated liquid displacement means extending into said reservoir for supplying and removing liquid with respect to the said one chamber for controlling the movement of said air bubble, a valve interposed between said chambers, said valve including a body having a bore communicating with one end of said tube, a second tube placing said bore in communication with one of said chambers, with the other end of said capillary tube communicating with the other chamber, said valve body being provided with an air inlet, and a valve plug rotatable in said bore and provided with means for cutting off communication between said chambers or to selectively establish communication between the chambers or between said air inlet and said capillary tube.

RICHARD O. CORNETT.

REFERENCES CITED

The following references are of record in the file of this patent:

UNITED STATES PATENTS

| Number | Name | Date |
|---|---|---|
| 283,490 | Hyatt | Aug. 21, 1883 |
| 2,303,111 | Cuyler et al. | Nov. 24, 1942 |
| 2,105,127 | Petroe | Jan. 11, 1938 |
| 1,100,171 | Brown | June 16, 1914 |

FOREIGN PATENTS

| Number | Country | Date |
|---|---|---|
| 822,555 | France | Sept. 20, 1937 |